United States Patent [19]
Miyazono

[11] Patent Number: 5,347,165
[45] Date of Patent: Sep. 13, 1994

[54] REDUNDANCY SYSTEM SWITCHING CONTROL SYSTEM

[75] Inventor: Takashi Miyazono, Tokyo, Japan

[73] Assignee: Nec Corporation, Japan

[21] Appl. No.: 984,534

[22] Filed: Dec. 2, 1992

[30] Foreign Application Priority Data

Dec. 3, 1991 [JP] Japan .................................. 344154

[51] Int. Cl.⁵ .............................................. H02J 4/00
[52] U.S. Cl. ......................................... 307/85; 307/43
[58] Field of Search ...................... 307/43, 52, 64, 66, 307/70, 85, 86, 112, 149

[56] References Cited
U.S. PATENT DOCUMENTS

| | | | |
|---|---|---|---|
| 4,757,474 | 7/1988 | Fukushi et al. | 365/189 |
| 5,027,002 | 6/1991 | Thornton | 307/35 |
| 5,204,836 | 4/1993 | Reed | 365/200 |

*Primary Examiner*—Jeffrey A. Gaffin
*Attorney, Agent, or Firm*—Ostrolenk, Faber, Gerb & Soffen

[57] ABSTRACT

A redundancy system switching control system includes two packages and logic circuits. The two packages are alternately switched as an operating system package and a standby system package. The logic circuits are arranged on the two packages, respectively, and each of the logic circuits outputs selection information/non-selection information to a remote package using self-package alarm information, self-package forcible switching information, remote-package alarm information, and selection information/non-selection information as four inputs. Each of the logic circuits, when a self-package serves as the operating system package, outputs selection information to the remote package by receiving any one of non-selection information from the remote package and the self-package alarm information when the self-package does not receive the remote-package alarm information. Each of the logic circuits, when the self-package serves as the standby system package, outputs non-selection information to the remote package by receiving any one of selection information from the remote package and the self-package forcible switching information.

6 Claims, 5 Drawing Sheets

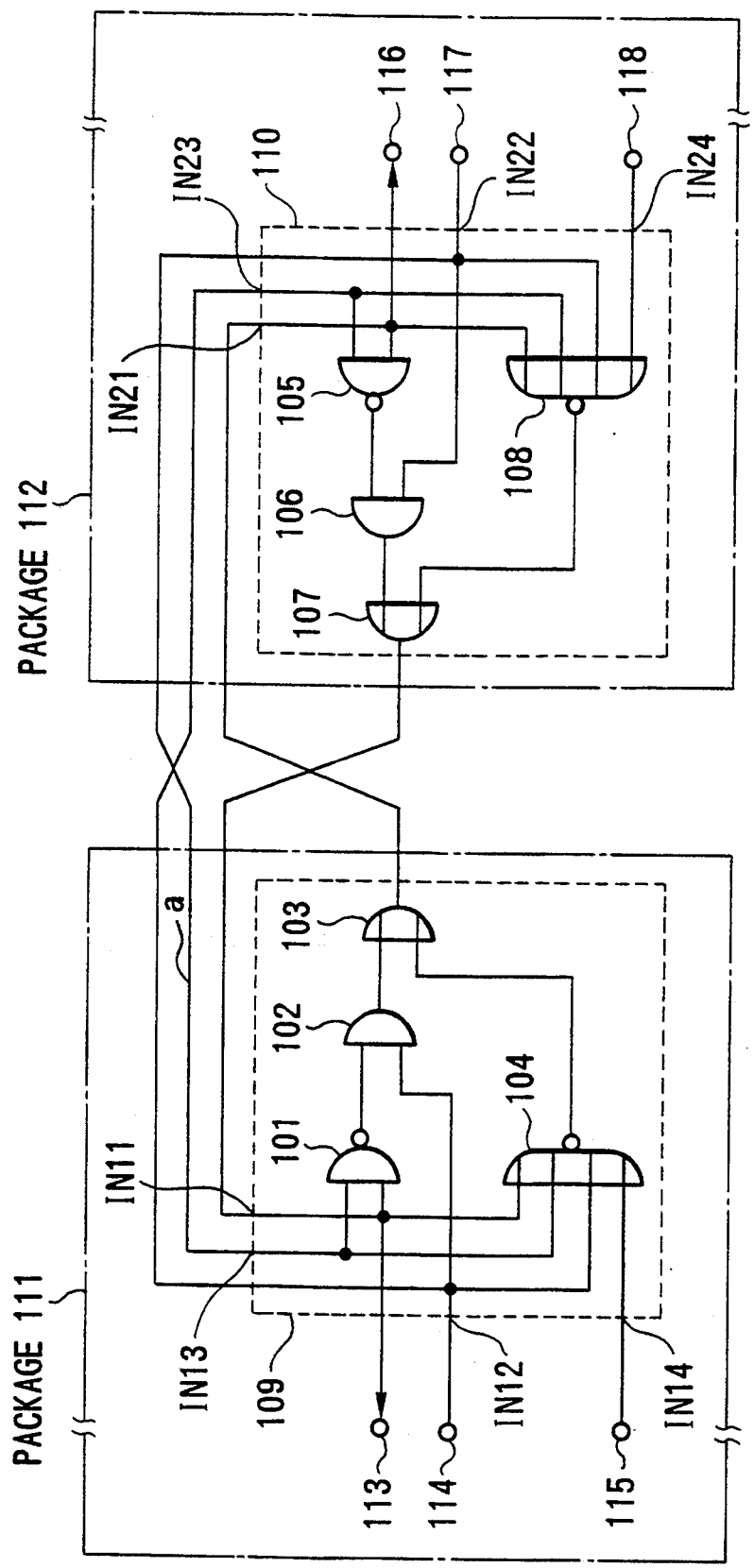
F I G. 1

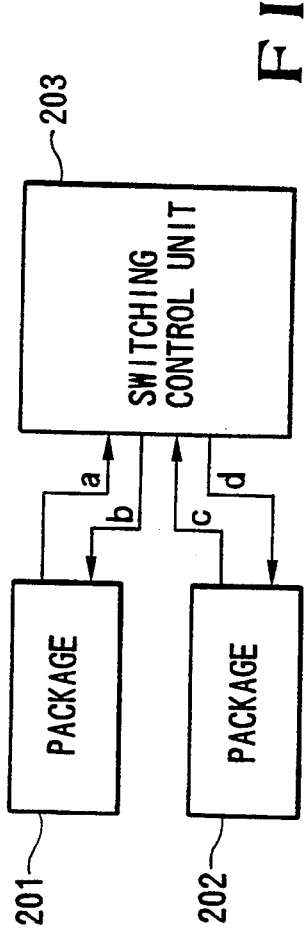
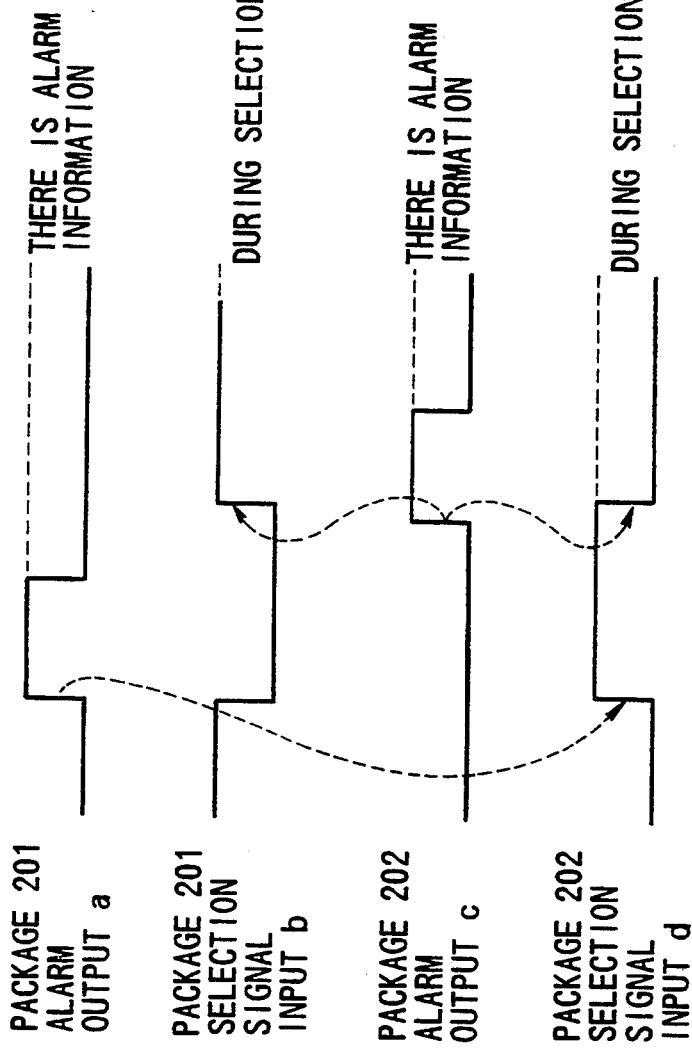
FIG. 3 PRIOR ART
FIG. 4A PRIOR ART
FIG. 4B PRIOR ART
FIG. 4C PRIOR ART
FIG. 4D PRIOR ART

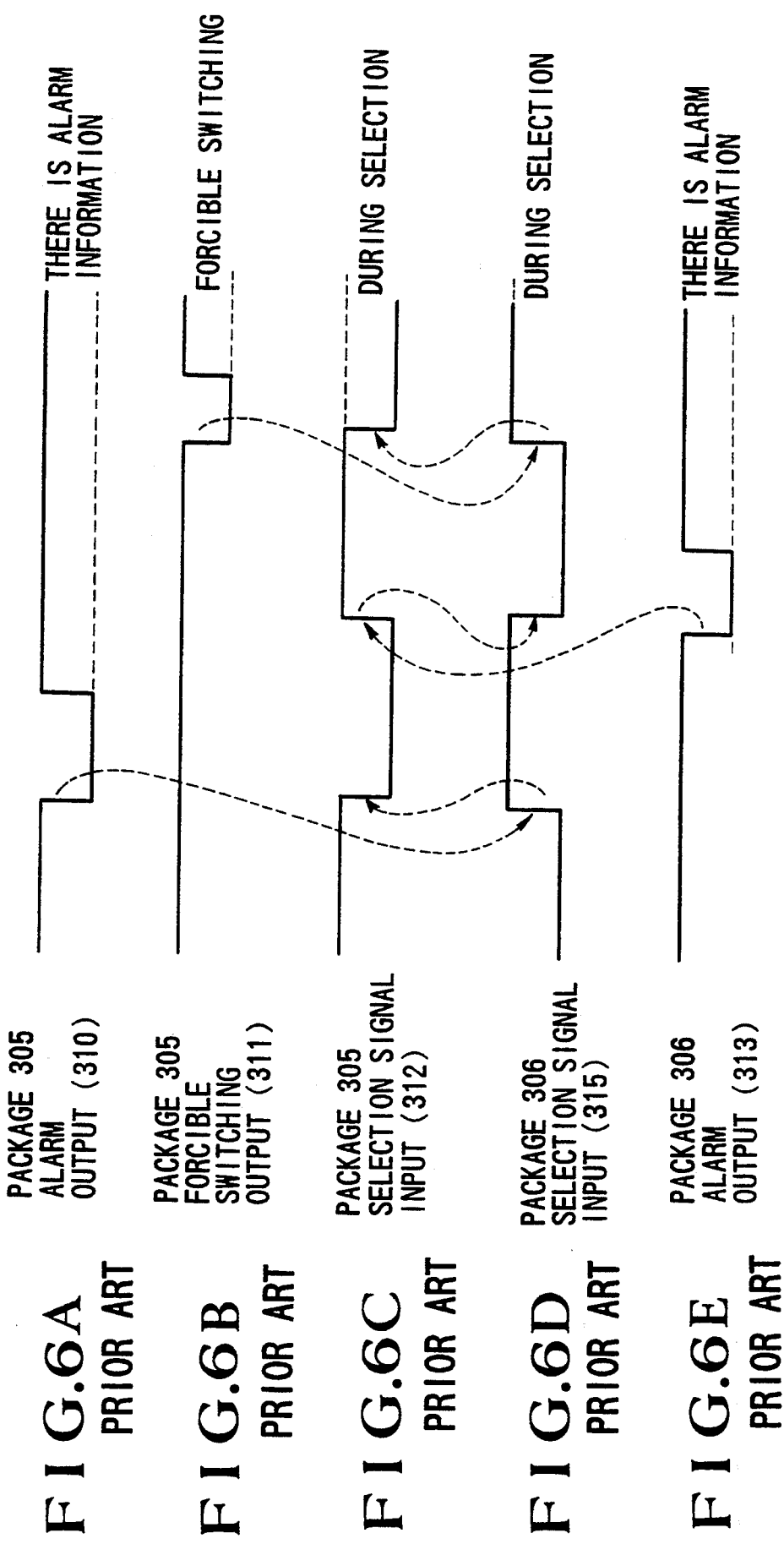

REDUNDANCY SYSTEM SWITCHING CONTROL SYSTEM

BACKGROUND OF THE INVENTION

The present invention relates to a redundancy system switching control system for two packages constituting a redundancy system.

Conventional switching control for packages constituting a redundancy system is performed as follows. For example, as shown in FIG. 3 as a block diagram showing a conventional switching control system for packages and in FIGS. 4A and 4D showing timing charts used for explaining an operation of the system, in addition to packages 201 and 202 constituting the redundancy system, a third package constituting a switching control unit 203 is arranged. The switching control unit 203 serving as the third package collects pieces of alarm information a and c from the package 201 and 202 constituting the redundancy system (FIGS. 4A and 4C), determines, and transmits selection signals b and d serving as operating system information and standby system information to the packages 201 and 202 constituting the redundancy system, respectively, thereby performing switching control (FIGS. 4B and 4D).

In addition, for example, as shown in FIG. 5 showing another conventional switching control system for packages and in FIGS. 6A and 6E showing timing charts used for explaining an operation of the system, packages 305 and 306 comprise AND circuits 301 and 303 and NAND circuits 302 and 304 serving as logic elements, respectively, and the outputs from the NAND circuits 302 and 304 are alternately input/output. When an alarm output at logic level "0" is generated by the package 305, the output from the NAND circuit 302 goes to logic level "1" (FIG. 6D), and the package 306 is selected as an operating system package. At the same time, the output from the NAND circuit 304 goes to logic level "0" (FIG. 6C), and the package 305 serves as a standby system package. Similarly, when an alarm output is generated by the package 306, the package 305 serves as the standby system package (FIGS. 6E and 6C). In addition, when a forcible switching control input supplied to a forcible switching control terminal 311 of the package 305 serving as the operating system package is set at logic level "0", the package 306 serves as the operating system (FIGS. 6B and 6D). With the above operation, switching control is realized.

In FIG. 5, reference numerals 310 and 313 denote alarm information input terminals receiving alarm outputs; 312 and 315, selection information output terminals which can obtain selection information outputs; and 311 and 314, forcible switching control input terminals for receiving forcible switching control inputs.

In the above switching control system shown in FIG. 3, since the switching control unit 203 serving as the third package for performing switching control does not have a redundancy arrangement, when the third package fails, switching control for the redundancy system is disabled.

In addition, in the switching control system shown in FIG. 5, since forcible switching control information must be transmitted to an operating system package, when the forcible switching control information cannot be transmitted to the operating system package due to some trouble such that the trouble cannot be detected by the operating system package, forcible switching control cannot be performed. Therefore, although a standby system package is perfectly normal, switching control is disabled.

SUMMARY OF THE INVENTION

It is an object of the present invention to provide a redundancy system switching control system capable of reliably performing switching control between two packages.

It is another object of the present invention to provide a redundancy system switching control system which does not require a third package for performing switching control.

It is still another object of the present invention to provide a redundancy system switching control system in which switching control information need not be transmitted to an operating system package.

In order to achieve the above objects, according to the present invention, there is provided a redundancy system switching control system comprising two packages alternately switched as an operating system package and a standby system package, and logic circuits which are arranged on the two packages, respectively, and each of which outputs selection information/non-selection information to a remote package using self-package alarm information, self-package forcible switching information, remote-package alarm information, and selection information/non-selection information as four inputs, wherein each of the logic circuits, when a self-package serves as the operating system package, outputs selection information to the remote package by receiving any one of non-selection information from the remote package and the self-package alarm information obtained when the self-package does not receive the remote-package alarm information, and each of the logic circuits, when the self-package serves as the standby system package, outputs non-selection information to the remote package by receiving any one of selection information from the remote package and the self-package forcible switching information.

BRIEF DESCRIPTION OF THE DRAWINGS

FIG. 1 is a diagram showing the arrangement of a switching control system according to an embodiment of the present invention;

FIG. 3 is a block diagram showing a conventional switching control system;

FIG. 4A to 4D are timing charts used for explaining an operation of the system in FIG. 3;

FIGS. 6A to 6E are timing charts used for explaining an operation of the system in FIG. 5.

DESCRIPTION OF THE PREFERRED EMBODIMENT

Figure 2:
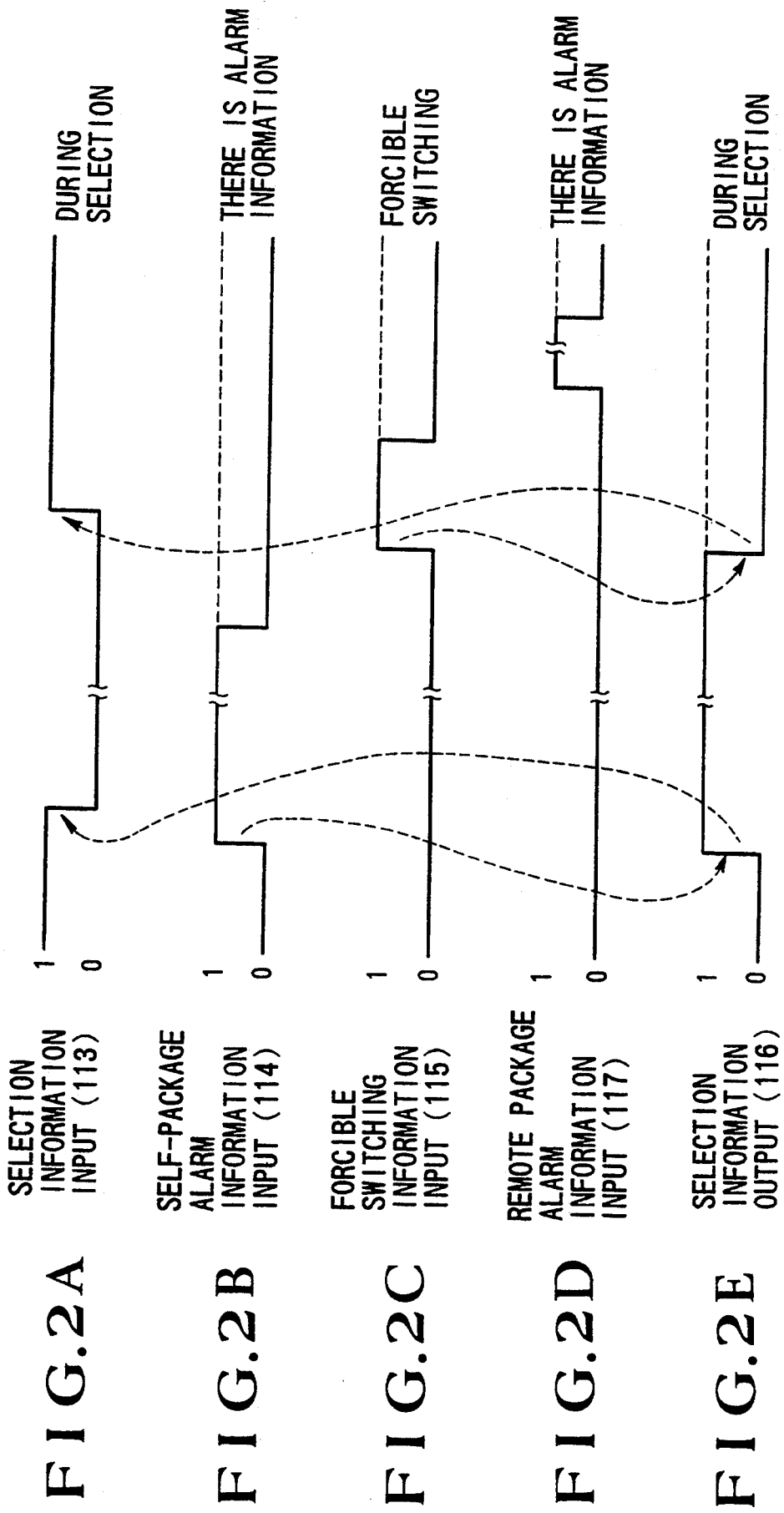
FIGS. 2A to 2E are timing charts used for explaining an operation of the system in FIG. 1.
Figure 5:
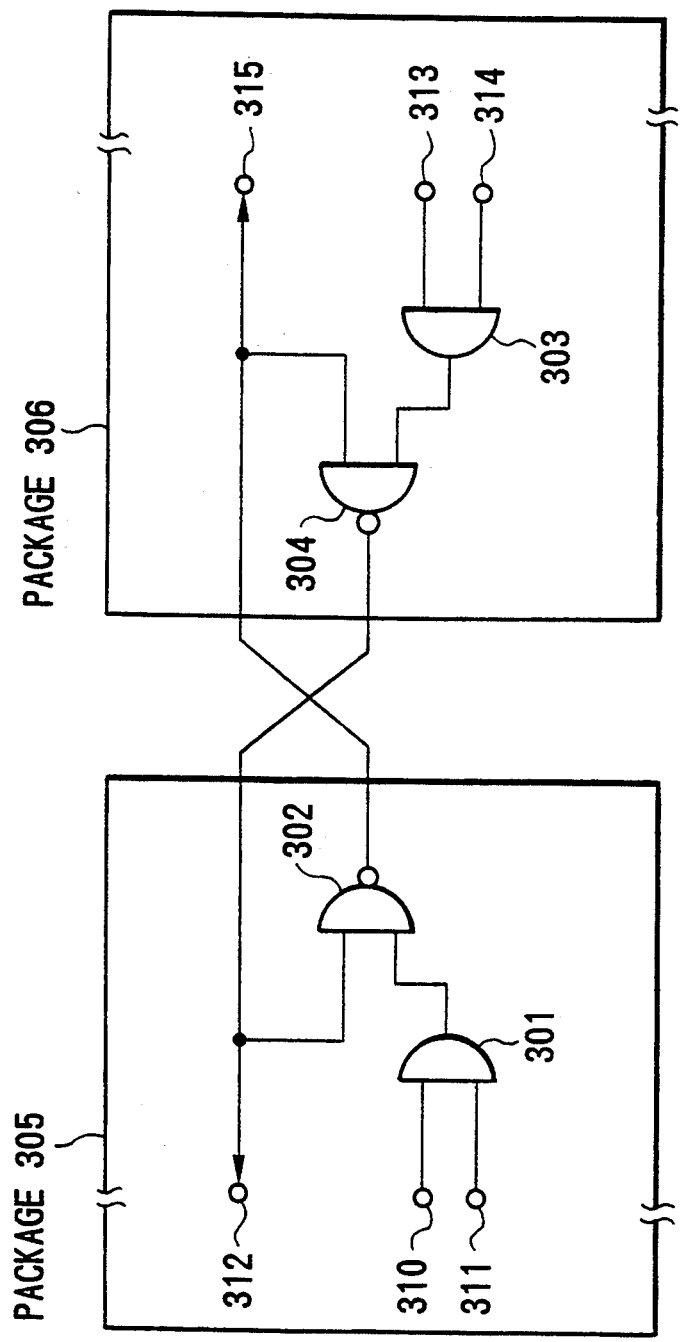
FIG. 5 is a diagram showing the arrangement of another conventional switching control system.

FIG. 1 shows a switching control system according to an embodiment of the present invention.

In FIG. 1, reference numerals 111 and 112 denote packages constituting a redundancy system. Reference numerals 101 and 105 denote NAND circuits; 102 and 106, AND circuits; 103 and 107, OR circuits; and 104 and 108, four-input NOR circuits. These circuits are arranged on the packages 111 and 112, respectively. The circuits arranged on the package 111 constitute a logic circuit 109 which outputs a self-package alarm input from a self-package alarm information input terminal 114 and outputs one of four forcible switching control inputs IN11 to IN14 from a forcible switching control input terminal 115 according to Table 1, and the circuits arranged on the package 112 constitute a logic circuit 110 which outputs a self-package alarm input from a self-package alarm information input terminal 117 and outputs one of four forcible switching control inputs IN21 to IN24 from a forcible switching control input terminal 118 according to Table 1. Table 1 expresses logic expressions of the logic circuits 109 and 110. Reference numerals 113 and 116 denote selection information output terminals from which selection information outputs are obtained.

TABLE 1

| First Input (IN11, IN12) | 0101010101010101 |
|---|---|
| Second Input (IN12, IN22) | 0011001100110011 |
| Third Input (IN13, IN23) | 0000111100001111 |
| Fourth Input (IN14, IN24) | 0000000011111111 |
| Output | 1011001000110010 |

In this case, alarm information input from the terminal 114 of the package 111 is supplied to the second input IN12 of the logic circuit 109 and the third input IN23 of the logic circuit 110 of the package 112 as information at logic level "1" representing an alarm state, and the output from the logic circuit 109 is supplied as the first input IN21 to the logic circuit 110 of the package 112. Forcible switching information input from the terminal 115 of the package 111 is supplied to the fourth input IN14 of the logic circuit 109 as information of logic level "1" for forcible switching control, and the output of the logic circuit 110 supplied from the package 112 is supplied to the first input IN11 of the logic circuit 109 of the package 111. The output having logic level "1" from the logic circuit 109 of the package 111 is used as selection information representing an operating system. The package 112 has the same arrangement as that of the package 111. Reference symbol a denotes a remote-package alarm information input.

Two pieces of self-package alarm information generated by these packages are input from the self-package alarm information input terminals 114 and 117, respectively. A package alarm information input from the self-package alarm information input terminal 114 is supplied to an input terminal of the AND circuit 102, an input terminal of the four-input NOR circuit 104, an input terminal of the NAND circuit 105 of the package 112, and an input terminal of the four-input NOR circuit 108. Similarly, a self-package alarm information input from the self-package alarm information input terminal 117 of the package 112 is supplied to an input terminal of the AND circuit 106, an input terminal of the four-input NOR circuit 108, and an input terminal of the NAND circuit 101, and an input terminal of the four-input NOR circuit 104. A forcible switching control input from the forcible switching control input terminal 115 of the package 111 is supplied to an input terminal of the four-input NOR circuit 104.

The output terminal of the four-input NOR circuit 104 is connected to an input terminal of the NAND circuit 101, and the output terminal of the NAND circuit 101 is connected to an input terminal of the AND circuit 102. The output terminal of the AND circuit 102 is connected to an input terminal of the OR circuit 103, and the output terminal of the OR circuit 103 is connected to the selection information output terminal 116 of the package 112, an input terminal of the NAND circuit 105, and an input terminal of the four-input NOR circuit 108. Similarly, a forcible switching control signal input from the forcible switching control input terminal 118 of the package 112 is supplied to an input terminal of the four-input NOR circuit 108, and the output terminal of the four-input NOR circuit 108 is connected to an input terminal of the OR circuit 107. The output terminal of the NAND circuit 105 is connected to an input terminal of the AND circuit 106, and the output terminal of the AND circuit 106 is connected to an input terminal of the OR circuit 107. The output terminal of the OR circuit 107 is connected to the selection information output terminal 113 of the package 111, an input terminal of the NAND circuit 101, and an input terminal of the four-input NOR circuit 104.

The timing charts in FIGS. 2A to 2E are used for explaining the operation of FIG. 1. Table 2 represents logic expressions of inputs to and outputs from the packages in FIG. 1, and corresponds to Table 1.

TABLE 2

| Logic Expression Number (n) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Self-package Selection Information Output (113) (Output from OR Circuit 107) | 0 | 1 | 0 | 1 | 0 | 1 | 0 | 1 | 0 | 1 | 0 | 1 | 0 | 1 | 0 | 1 |
| Self-package Alarm Information Input (114) | 0 | 0 | 1 | 1 | 0 | 0 | 1 | 1 | 0 | 0 | 1 | 1 | 0 | 0 | 1 | 1 |
| Remote-package Alarm Information Input (a) | 0 | 0 | 0 | 0 | 1 | 1 | 1 | 1 | 0 | 0 | 0 | 0 | 1 | 1 | 1 | 1 |
| Forcible Return Input (115) Serving as Forcible Switching Control Input Remote-package | 0 | 0 | 0 | 0 | 0 | 0 | 0 | 0 | 1 | 1 | 1 | 1 | 1 | 1 | 1 | 1 |

TABLE 2-continued

| Selection Information Output (116) (Output from OR Circuit 103) | 1 | 0 | 1 | 1 | 0 | 0 | 1 | 0 | 0 | 0 | 1 | 1 | 0 | 0 | 1 | 0 |

An operation of the embodiment shown in FIG. 1 will be described below with reference to FIGS. 2A to 2E and Table 2.

When there is no alarm information in both the packages 111 and 112, the self-package alarm information inputs from the self-package alarm information input terminals 114 and 117 are set at logic level "0". In addition, when there is no forcible switching control information, the forcible switching control inputs are set at logic level "0". For example, when the output from the OR circuit 103 of the package 111 is set at logic level "0", according to Logic Expression (2) shown in Table 2, the output from the OR circuit 107 goes to logic level "1". Therefore, the selection information output from the package 111 goes to logic level "1". In this case, the state wherein the selection information output is set at logic level "1" represents that the package 111 serves as an operating system package. In contrast to this, the selection information output from the package 112 is set at logic level "0", and this state represents that the package 112 serves as a standby system package.

In this case, when an alarm output is generated by the package 111 serving as the operating system package, and the self-package alarm information input from the self-package alarm information input terminal 114 goes to logic level "1" (FIG. 2B), the output from the OR circuit 103 goes to logic level "1" according to Logic Expression (4) shown in Table 2, and an output obtained from the selection information output terminal 116 of the package 112 goes to logic level "1". This state represents that the package 112 serves as an operating system package (FIG. 2E). This will be described below using FIG. 1. Since the input of logic level "0" from the self-package alarm information input terminal 117 of the package 112 is input to the NAND circuit 101 to cause the output from the NAND circuit 101 to be set at logic level "0", when the self-package alarm information input of logic level "1" from the self-package alarm information input terminal 114 is input to the AND circuit 102, the output from the AND circuit 102 goes to logic level "1", and this output is output as selection information through the OR circuit 103. At the same time, the output from the OR circuit 107 of the package 112 goes to logic level "0" according to Logic Expression (3) in FIG. 2. Therefore, a selection information output obtained from the selection information output terminal 113 of the package 111 goes to logic level "0", and this state represents that the package 111 serves as a standby system package (FIG. 2A).

With the above operation, when alarm information is generated by an operating system package, switching control is automatically performed, and recognition of the operating system in the packages is changed.

In addition, when the package 112 serves as an operating system package, and the forcible switching control input terminal 115 of the package 111 serving as a standby system package is set at logic level "1" (FIG. 2C), according to Logic Expression (9) in Table 2, the output from the OR circuit 103 goes to logic level "0", and the package 112 is changed into the standby system package (FIG. 2E). At the same time, according to Logic Expression (10) in Table 2, the output from the OR circuit 107 goes to logic level "1", and the package 111 is changed to the operating system package (FIG. 2A). Therefore, when forcible switching control is performed to the standby system package, the standby system package can be changed to the operating system package.

Even when alarm information is input from the self-package alarm information input terminal 117 while the package 112 serves as the standby system package, the selection information outputs from the packages 111 and 112 are not changed (FIG. 2D) because of the following reason. That is, in the package 112, although the logic level of the output from the OR circuit 107 is changed to logic level "1" by inputting the alarm information to the package 112, and at the same time, the logic level of the output from the AND circuit 106 is changed to logic level "1", thereby holding the output from the OR circuit 107 to be logic level "1". On the other hand, in the package 111, although the logic level of the output from the OR circuit 103 is changed to logic level "0" by inputting the alarm information from the package 112, the output from the AND circuit 102 is held to be logic level "0", and the output from the OR circuit 103 set at logic level "0" is not changed.

As described above, according to the present invention, when alarm information is generated by an operating system package, switching control is automatically performed, recognition of the operating system in packages is changed. In addition, since forcible switching control is performed to a standby system package such that the standby system package is changed to an operating system package, the circuits of the packages can be constituted by logic elements. Therefore, switching control for the packages can be performed more reliably than that of a conventional system by a simple logic circuit arrangement.

What is claimed is:

1. A redundancy system switching control system comprising:
    two packages alternately switched as an operating system package and a standby system package; and
    logic circuits which are arranged on said two packages, respectively, and each of which outputs selection information/non-selection information to a remote package using self-package alarm information, self-package forcible switching information, remote-package alarm information, and selection information/non-selection information as four inputs,
    wherein each of said logic circuits, when a self-package serves as said operating system package, outputs selection information to said remote package by receiving any one of non-selection information from said remote package and the self-package alarm information obtained when said self-package does not receive the remote-package alarm information, and each of said logic circuits, when said self-package serves as said standby system package, outputs non-selection information to said remote package by receiving any one of selection information from said remote package and the self-package forcible switching information.

2. A system according to claim 1, wherein each of said logic circuits, when said self package serves as a standby system package, holds selection information output to said remote package in response to input of the self-package alarm information.

3. A system according to claim 1, wherein each of said logic circuits, when said self package serves as an operating system package, holds non-selection information output to said remote package in response to input of the remote-package alarm information.

4. A system according to claim 1, wherein each of said logic circuits, when said self package serves as an operating system package, holds non-selection information output to said remote package in response to input of the self-package alarm information.

5. A system according to claim 1, wherein each of said logic circuits comprises a first gate circuit for outputting the remote-package selection information when all the four inputs are not input and a second gate circuit for outputting the remote-package selection information by receiving the self-package alarm information when at least any one of selection information from said remote package and the remote-package alarm information is not input.

6. A system according to claim 5, wherein said first gate circuit is constituted by a four-input NOR circuit, said second gate circuit is constituted by an OR circuit for receiving the selection information from said remote package and the remote-package alarm information and an AND circuit for receiving an output from said OR circuit and the self-package alarm information, and an output from said NOR circuit and an output from said AND circuit are output as the remote-package selection information through said OR circuit.

* * * * *

UNITED STATES PATENT AND TRADEMARK OFFICE
CERTIFICATE OF CORRECTION

PATENT NO. : 5,347,165
DATED : September 13, 1994
INVENTOR(S) : Takashi MIYAZONO It is certified that error appears in the above-identified patent and that said Letters Patent is hereby corrected as shown below:

On the title page, at Item 30, Foreign Application Priority Data, please change "344154" to read --3/344154--.

Signed and Sealed this

Twenty-seventh Day of December, 1994

Attest:

BRUCE LEHMAN

*Attesting Officer*  *Commissioner of Patents and Trademarks*